United States Patent
Duan

(10) Patent No.: US 12,313,787 B2
(45) Date of Patent: May 27, 2025

(54) ELECTRONIC DEVICE, AND INTERACTION METHOD AND DEVICE

(71) Applicant: VIVO MOBILE COMMUNICATION CO., LTD., Guangdong (CN)

(72) Inventor: Junjie Duan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 357 days.

(21) Appl. No.: 17/954,405

(22) Filed: Sep. 28, 2022

(65) Prior Publication Data

US 2023/0019967 A1 Jan. 19, 2023

Related U.S. Application Data

(63) Continuation of application No. PCT/CN2021/075753, filed on Feb. 7, 2021.

(30) Foreign Application Priority Data

Apr. 3, 2020 (CN) .......................... 202010261292.X

(51) Int. Cl.
*G01S 7/481* (2006.01)
*G01B 11/26* (2006.01)
(Continued)

(52) U.S. Cl.
CPC ............ *G01S 7/4817* (2013.01); *G01B 11/26* (2013.01); *G01S 7/4814* (2013.01); *G06F 3/0308* (2013.01); *G02B 5/08* (2013.01)

(58) Field of Classification Search
CPC ..... G01S 7/4817; G01S 7/4814; G01B 11/26; G06F 3/0308; G02B 5/08
See application file for complete search history.

(56) References Cited

U.S. PATENT DOCUMENTS 6,020,967 A  * 2/2000 Gregorio ................. G01D 5/34
                                                                356/614
10,203,662 B1* 2/2019 Lin ........................... G01D 5/30
(Continued)

FOREIGN PATENT DOCUMENTS

CN        101982736 A        3/2011
CN        108592827 A        9/2018
(Continued)

OTHER PUBLICATIONS

International Search Report and Written Opinion of the International Searching Authority regarding International Patent Application No. PCT/CN2021/075753, dated Apr. 25, 2021. Translation provided by Bohui Intellectual Property.
(Continued)

*Primary Examiner* — Ariel A Balaoing
(74) *Attorney, Agent, or Firm* — Harness, Dickey & Pierce, P.L.C.

(57) ABSTRACT

An electronic device includes a rotating member and an infrared module that are disposed opposite to each other. A surface of the rotating member opposite to the infrared module is provided with an annular region, a reflective surface is disposed on the annular region, and a width of the reflective surface gradually increases or gradually decreases along a circumferential direction of the annular region. The infrared module includes an infrared transmitter and an infrared receiver, and light emitted by the infrared transmitter is reflected by the reflective surface and then received by the infrared receiver.

9 Claims, 5 Drawing Sheets

(51) Int. Cl.
  *G02B 5/08* (2006.01)
  *G06F 3/03* (2006.01)

(56) References Cited

U.S. PATENT DOCUMENTS

| 2007/0075230 | A1* | 4/2007 | Sun .................... H03M 1/06 |
| | | | 250/231.13 |
| 2010/0117995 | A1* | 5/2010 | Park .................. G01D 5/34715 |
| | | | 345/184 |
| 2018/0321640 | A1* | 11/2018 | Miyoshi .............. G06F 3/03547 |
| 2019/0025940 | A1 | 1/2019 | Shim et al. |
| 2020/0089331 | A1* | 3/2020 | Yang .................... G06F 3/0362 |
| 2022/0090945 | A1 | 3/2022 | Chen et al. |

FOREIGN PATENT DOCUMENTS

| CN | 207976717 U | 10/2018 |
| CN | 108803780 A | 11/2018 |
| CN | 109257466 A | 1/2019 |
| CN | 109861757 A | 6/2019 |
| CN | 110332950 A | 10/2019 |
| CN | 209461483 U | 10/2019 |
| CN | 111552166 A | 8/2020 |
| EP | 1035404 A1 | 9/2000 |
| EP | 1619342 A1 | 1/2006 |
| JP | H0743134 A | 2/1995 |
| JP | H0787393 A | 3/1995 |
| JP | 2006106240 A | 4/2006 |
| JP | 2007266344 A | 10/2007 |
| JP | 2015111772 A | 6/2015 |

OTHER PUBLICATIONS

First Office Action regarding Chinese Patent Application No. 202010261292.X, dated Mar. 3, 2021. Translation provided by Bohui Intellectual Property.
Extended European Search Report regarding European Patent Application No. 21780676.9, dated Aug. 4, 2023.
First Office Action regarding Japanese Patent Application No. 2022-559469, dated Oct. 6, 2023.
Decision of Refusal regarding Japanese Patent Application No. 2022-559469, dated Jan. 12, 2024.

* cited by examiner

ELECTRONIC DEVICE, AND INTERACTION METHOD AND DEVICE

CROSS-REFERENCE TO RELATED APPLICATIONS

This disclosure is a Bypass Continuation Application of PCT/CN2021/075753 filed on Feb. 7, 2021, which claims priority to Chinese Patent Application No. 202010261292.X filed on Apr. 3, 2020, which are incorporated herein by reference in their entirety.

TECHNICAL FIELD

The present disclosure relates to the field of intelligent interaction, and in particular, to an electronic device, and an interaction method and device.

BACKGROUND

The existing bezels generally perform rotation interaction through magnetic coding. Several magnets are placed on a bezel, and a magnetic field sensor is placed under the bezel. When the bezel is rotated, a magnetic field direction of the magnets changes. The change of the magnetic field is detected by the magnetic field sensor to identify the rotation, and then interaction is performed. This method has some disadvantages: the structure is complex, and magnets need to be added to the bezel; it is easy to be interfered by an external magnetic field; and the added magnets interfere with an electronic compass on the watch. Therefore, there is an urgent need for a better device and an interaction solution thereof.

SUMMARY

According to a first aspect, an embodiment of the present disclosure provides an electronic device, including a rotating member and an infrared module, wherein the rotating member and the infrared module are disposed opposite to each other; a surface of the rotating member opposite the infrared module is provided with an annular region, a reflective surface is disposed on the annular region, and a width of the reflective surface gradually increases or gradually decreases along a circumferential direction of the annular region; the infrared module includes an infrared transmitter and an infrared receiver, and light emitted by the infrared transmitter is reflected by the reflective surface and then received by the infrared receiver, where during rotation of the rotating member, the light received by the infrared receiver is enhanced with an increase of a width of a portion of the reflective surface directly facing the infrared module.

According to a second aspect, an embodiment of the present disclosure further provides an interaction method, applied to the electronic device according to the first aspect, and including: obtaining first infrared energy in a case that the infrared module is located at a first relative position of the rotating member; obtaining second infrared energy in a case that the infrared module is located at a second relative position of the rotating member; and determining a rotation angle and/or a rotation direction of the rotating member according to the first infrared energy and the second infrared energy, where the first relative position is a position of the infrared module relative to the rotating member before the rotating member rotates, and the second relative position is a position of the infrared module relative to the rotating member after the rotating member rotates.

According to a third aspect, an embodiment of the present disclosure further provides an interaction device, applied to the interaction method according to the second aspect, and including: a first obtaining module, configured to obtain first infrared energy in a case that an infrared module is located at a first relative position of a rotating member; a second obtaining module, configured to obtain second infrared energy in a case that the infrared module is located at a second relative position of the rotating member; and a first determining module, configured to determine a rotation angle and/or a rotation direction of the rotating member according to the first infrared energy and the second infrared energy, where the first relative position is a position of the infrared module relative to the rotating member before the rotating member rotates, and the second relative position is a position of the infrared module relative to the rotating member after the rotating member rotates.

According to a fourth aspect, an embodiment of the present disclosure further provides an electronic device, including: a memory, storing computer program instructions; and a processor, implementing the interaction method according to the second aspect when the computer program instructions are executed by the processor.

According to a fifth aspect, an embodiment of the present disclosure further provides a non-transitory computer readable storage medium, where the non-transitory computer readable storage medium includes instructions, and the instructions, when run on a computer, cause the computer to perform the interaction method according to the second aspect.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following descriptions show merely some embodiments of the present disclosure, and a person of ordinary skill in the art may still derive other accompanying drawings from these accompanying drawings.

DETAILED DESCRIPTION

The following clearly describes the technical solutions in the embodiments of the present disclosure with reference to the accompanying drawings in the embodiments of the present disclosure. Apparently, the described embodiments are some embodiments of this application rather than all of the embodiments. All other embodiments obtained by a person of ordinary skill in the art based on the embodiments of the present disclosure shall fall within the protection scope of the present disclosure.

The term "and/or" used herein describes an association relationship for describing associated objects and represents that three relationships may exist. For example, a rotation angle and/or a rotation direction may represent the following three cases: Only the rotation angle exists, both the rotation angle and the rotation direction exist, and only the rotation direction exists.

Figure 1:
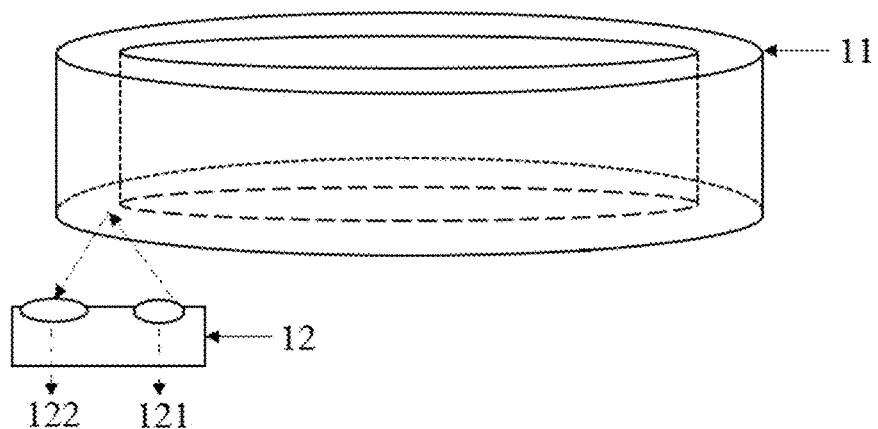
FIG. 1 is a schematic structural diagram of an electronic device according to an embodiment of the present disclosure.
Figure 2:
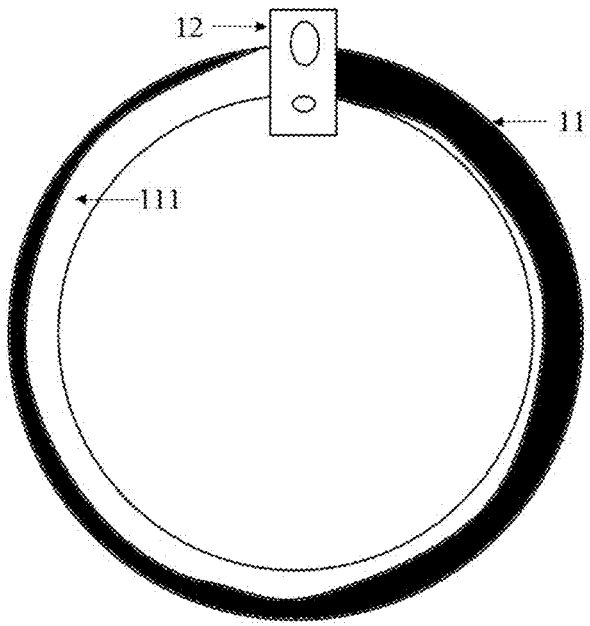
FIG. 2 is a schematic diagram of an annular region of a rotating member according to an embodiment of the present disclosure.

FIG. 1 is a schematic structural diagram of an electronic device according to an embodiment of the present disclosure. As shown in FIG. 1, the electronic device includes: a rotating member 11 and an infrared module 12, and the rotating member 11 and the infrared module 12 are disposed opposite to each other. A surface of the rotating member 11 opposite to the infrared module 12 is provided with an annular region (as shown in FIG. 2), a reflective surface 111 is disposed on the annular region, and a width of the reflective surface gradually increases or gradually decreases along a circumferential direction of the annular region.

The infrared module 12 includes an infrared transmitter 121 and an infrared receiver 122, and light emitted by the infrared transmitter 121 is reflected by the reflective surface 111 and received by the infrared receiver 122. During rotation of the rotating member 11, the light received by the infrared receiver 122 is enhanced with an increase of a width of a portion of the reflective surface 111 directly facing the infrared module 12.

In an embodiment, the electronic device may be a device including a rotating member, such as a watch with a rotating bezel, or a machine tool with a rotating assembly.

For example, the electronic device is a smart watch with a rotating bezel. The rotating member 11 includes an annular bezel rotatable relative to a base, and an infrared module 12 is disposed on the base. A surface of the bezel opposite to the base includes a reflective surface and a non-reflective surface, the reflective surface has an excellent infrared reflection capability and the non-reflective surface has an excellent infrared absorption capability. A width of the reflective surface gradually increases or gradually decreases along a circumferential direction of the bezel, that is, the width of the reflective surface gradually increases or gradually decreases along a clockwise or counterclockwise direction. A possible situation is that, the width of the reflective surface on the bezel gradually increases along the clockwise direction, that is, an infrared reflection capability of a region on the bezel opposite to the infrared module 12 gradually increases with the clockwise rotation of the bezel relative to the base. The light emitted by the infrared transmitter 121 is reflected by the region on the bezel opposite to the infrared module 12 and received by the infrared receiver 122. During the clockwise rotation of the bezel, the strength of the light received by the infrared receiver 122 gradually increases. It should be noted that, the width of the reflective surface may also gradually decrease along the clockwise direction, which is not limited in this embodiment of the present disclosure.

In an embodiment, the reflective surface 111 is coated with a reflective layer. The reflective layer can increase the infrared absorption capability of the reflective surface 111. Optionally, the reflective layer is an infrared reflective pigment coating such as a nano-silicon dioxide coating or a nanometer titanium dioxide coating and has high infrared reflectivity. Correspondingly, a region other than the reflective surface 111 on the rotating member 11 may be coated with a light absorption layer, such as a carbon black coating. The reflective layer is coated on the reflective surface and the light absorption layer is coated on the region other than the reflective surface, to increase a difference in the infrared reflection capability between the reflective surface and the region other than the reflective surface. During rotation of the rotating member, the infrared module detects a large signal change rate, which is beneficial to improving the detection accuracy.

In an embodiment, the reflective surface 111 and the region other than the reflective surface 111 have different gray scales. As shown in FIG. 2, the reflective surface 111 is set to be white, and a region on the annular region other than the reflective surface 111 is set to be black. White and black have different gray scales and different infrared reflection capabilities. The white region has a strong infrared reflection capability, while the black region has a weak infrared reflection capability. Therefore, with the rotation of the rotating member, a width of a region of the white reflective surface relative to the infrared module gradually changes, and the strength of the signal received by the infrared module gradually changes. Relative positions of the rotating member 11 and the infrared module 12 can be determined according to the strength of the signal received by the infrared module, and a rotation angle and direction of the rotating member 11 can be obtained. Different colors can be set to improve the difference of the infrared reflection capability between the reflective surface and the region other than the reflective surface, thereby improving the detection accuracy of the infrared receiver.

In the electronic device provided in this embodiment of the present disclosure, the infrared module is disposed in the electronic device, and the reflective surface whose width gradually changes along the circumferential direction is disposed on the annular region of the rotating member opposite to the infrared module. The reflection strength of infrared light reflected in the region of the rotating member opposite to the infrared module can be collected to determine the relative positions of the rotating member and the infrared module, and then determine the rotation angle and direction of the rotating member. Compared with the conventional method of adding magnets or other components that are easy to cause interference to the device and make the device vulnerable to external interference in the device, the electronic device has a simple structure and is easy to implement.

Figure 3:
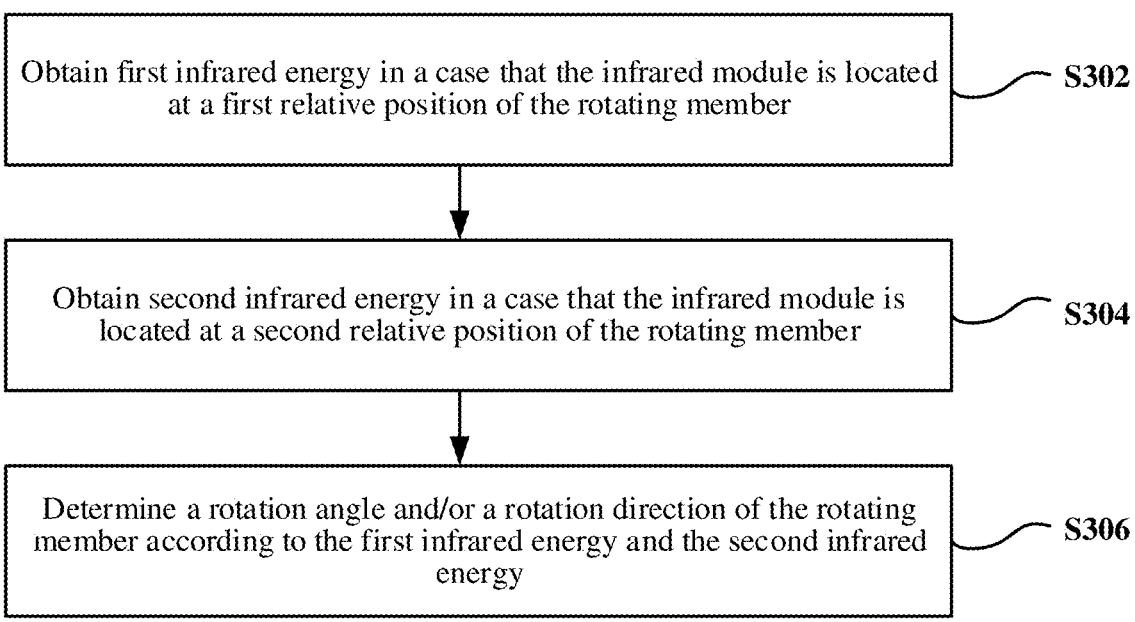
FIG. 3 is a schematic flowchart of an interaction method according to an embodiment of the present disclosure.

FIG. 3 is a schematic flowchart of an interaction method according to an embodiment of the present disclosure. The method is applied to the electronic device shown in FIG. 1 and FIG. 2. The method in FIG. 3 may include the following steps.

S302. Obtain first infrared energy in a case that the infrared module is located at a first relative position of the rotating member.

The first relative position is a position of the infrared module relative to the rotating member before the rotating member rotates.

S304. Obtain second infrared energy in a case that the infrared module is located at a second relative position of the rotating member.

The second relative position is a position of the infrared module relative to the rotating member after the rotating member rotates.

S306. Determine a rotation angle and/or a rotation direction of the rotating member according to the first infrared energy and the second infrared energy.

In the interaction method provided in this embodiment of the present disclosure, the infrared energy of the infrared module at different positions is obtained, and the rotation angle and/or the rotation direction of the rotating member are determined according to the infrared energy, thereby implementing device interaction, resolving the problem of poor anti-interference capability of the device during the rotation interaction, and improving the accuracy of interaction results.

In an embodiment, when the rotation angle and/or the rotation direction of the rotating member are determined according to the first infrared energy and the second infrared energy, a first angle corresponding to the first infrared energy and a second angle corresponding to the second infrared energy can be determined according to a preset correspondence between infrared energy and an angle, and the rotation angle and the rotation direction of the rotating member can be determined according to an angle difference between the first angle and the second angle.

In the correspondence between the infrared energy and the angle, the "angle" refers to: when the infrared module is located at a certain relative position of the rotating member, a deviation angle of the relative position in a specified direction relative to an initial rotation position of the rotating member (a center point of the rotating member is a circle point). The initial rotation position may be arbitrarily specified. For example, the initial rotation position is a position at which a smallest or largest width of a reflective surface of the infrared module on an annular region of the rotating member is obtained. The specified direction may be clockwise or counterclockwise along the circumference of the annular region.

Based on the foregoing definition of angle, the first angle corresponding to the first infrared energy is a deviation angle of the first relative position in the specified direction relative to the initial rotation position of the rotating member, and the second angle corresponding to the second infrared energy is a deviation angle of the second relative position in the specified direction relative to the initial rotation position of the rotating member.

Figure 4:
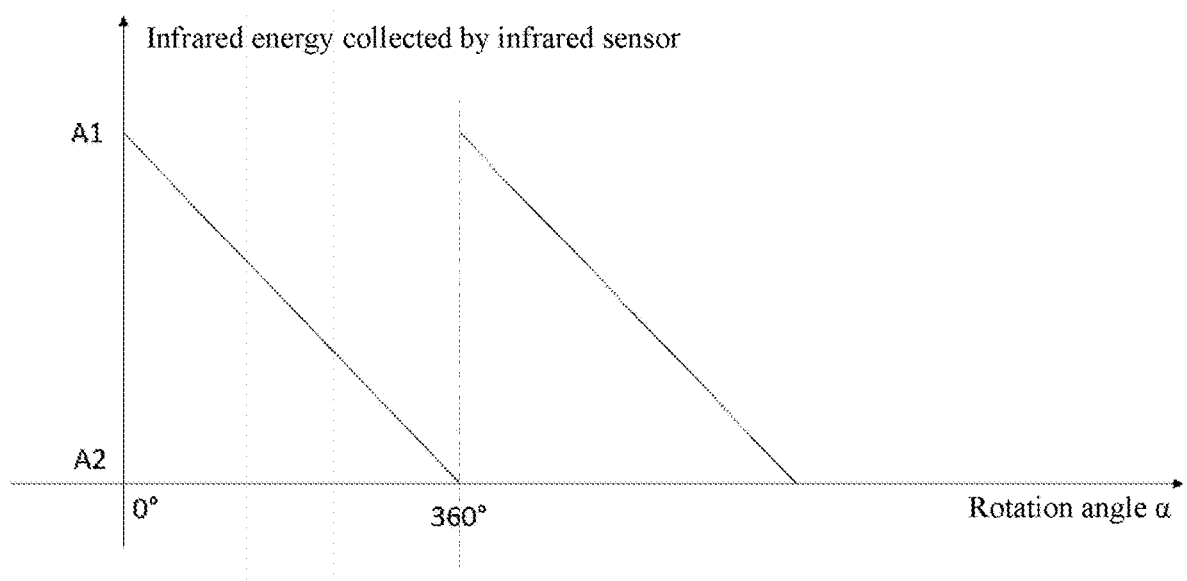
FIG. 4 is a diagram of a correspondence between infrared energy and an angle according to an embodiment of the present disclosure.

The correspondence between the infrared energy and angle $\alpha$ is shown in FIG. 4. It is known that, the infrared energy corresponding to the angle of 0° is A1, and the infrared energy corresponding to the angle of 360° is A2. Then a correspondence between any infrared energy X between A1 and A2 and angle $\alpha$ may be represented by the following formula: $\alpha=360°\times(A1-X)/(A1-A2)$. There is a negative correlation between the infrared energy and the angle.

In this embodiment, if the first infrared energy is greater than the second infrared energy, it can be determined from FIG. 4 that, the first angle corresponding to the first infrared energy is less than the second angle corresponding to the second infrared energy. That is, the angle difference between the first angle and the second angle is less than 0. In this case, the rotation direction of the rotating member can be determined as a direction along which the width of the reflective surface gradually decreases. If the first infrared energy is less than the second infrared energy, the first angle corresponding to the first infrared energy is greater than the second angle corresponding to the second infrared energy. That is, the angle difference between the first angle and the second angle is greater than 0. In this case, the rotation direction of the rotating member can be determined as a direction along which the width of the reflective surface gradually increases.

Using the electronic device shown in FIG. 2 as an example, if the first infrared energy is greater than the second infrared energy, that is, the angle difference between the first angle and the second angle is less than 0, the rotation direction of the rotating member is clockwise. If the first infrared energy is less than the second infrared energy, that is, the angle difference between the first angle and the second angle is greater than 0, the rotation direction of the rotating member is counterclockwise.

In this embodiment, the rotation angle and the rotation direction of the rotating member can be determined according to the first infrared energy and the second infrared energy, so that the determining method of the rotation angle and the rotation direction of the rotating member is simple and fast. In addition, the infrared energy is received by the infrared module and the infrared module does not cause interference to the electronic device. Therefore, compared with the conventional method, the accuracy of the determined results of the rotation angle and the rotation direction of the rotating member is improved.

In an embodiment, a first interaction instruction corresponding to the rotation angle and/or the rotation direction of the rotating member can be determined according to a preset correspondence between a rotation angle and/or a rotation direction and a device interaction instruction.

The device interaction instruction may be a page turning instruction, an adjustment instruction, or the like. The first interaction instruction is used to instruct the electronic device to perform an operation corresponding to the first interaction instruction.

For example, the page turning instruction is executed by rotating in the direction along which the width of the reflective surface gradually increases, and it is preset that, every 30° of rotation corresponds to turning one page backward. When the rotation direction is the direction along which the width of the reflective surface gradually increases and the rotation angle is 120°, it can be determined that, the first interaction instruction is to turn four pages backward.

Using the foregoing example, it is assumed that a display interface of a watch with a rotating bezel includes 5 display pages, there are 5 function options of "call", "location", "settings", "sports", and "health" in sequence, and a current display interface is the "location" function option. When the rotation direction is the direction along which the width of the reflective surface gradually increases and the rotation angle is 60°, it is determined to turn 2 function options backward, that is, turn to the display page of the "sports" function option.

In this embodiment, the first interaction instruction corresponding to the rotation angle and/or the rotation direction of the rotating member can be determined according to the preset correspondence between the rotation angle and/or the rotation direction and the device interaction instruction. In addition, the operation corresponding to the first interaction instruction is performed, that is, the corresponding interaction instruction can be determined through the rotation angle and/or the rotation direction of the electronic device, thereby implementing the rotation interaction and improving the rotation interaction experience of a user.

Figure 5:
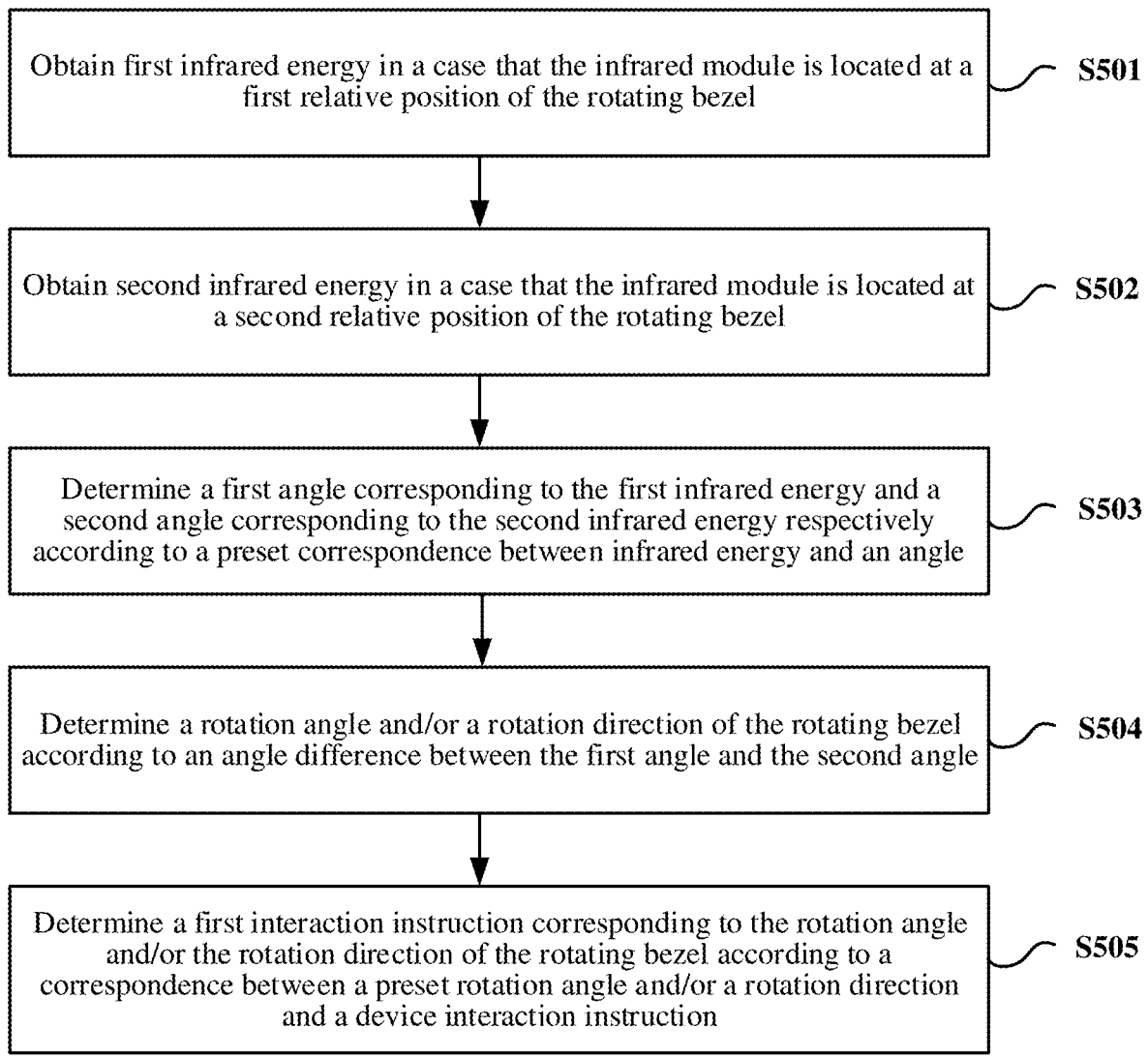
FIG. 5 is a schematic flowchart of a device interaction method according to another embodiment of the present disclosure.

FIG. 5 is a schematic flowchart of an interaction method according to another embodiment of the present disclosure. In this embodiment, the interaction method is applied to a watch provided with a rotating bezel and an infrared module.

A structure of the watch is shown in FIG. 1 and FIG. 2, and the method in FIG. 5 may include the following steps.

S501. Obtain second infrared energy in a case that the infrared module is located at a second relative position of the rotating bezel.

The first relative position is a position of the infrared module relative to the rotating bezel before the rotating bezel rotates.

S502. Obtain second infrared energy in a case that the infrared module is located at a second relative position of the rotating bezel.

The second relative position is a position of the infrared module relative to the rotating bezel after the rotating bezel rotates.

S503. Determine a first angle corresponding to the first infrared energy and a second angle corresponding to the second infrared energy according to a preset correspondence between infrared energy and an angle.

In the correspondence between the infrared energy and the angle, the "angle" refers to: when the infrared module is located at a certain relative position of the rotating bezel, a deviation angle of the relative position in a specified direction relative to an initial rotation position of the rotating bezel (a center point of the rotating bezel is a circle point). The initial rotation position may be arbitrarily specified. For example, the initial rotation position is a position at which a smallest or largest width of a reflective surface of the infrared module on an annular region of the rotating bezel is obtained. The specified direction may be clockwise or counterclockwise along the circumference of the annular region.

Based on the foregoing definition of angle, the first angle corresponding to the first infrared energy is a deviation angle of the first relative position in the specified direction relative to the initial rotation position of the rotating bezel, and the second angle corresponding to the second infrared energy is a deviation angle of the second relative position in the specified direction relative to the initial rotation position of the rotating bezel.

The correspondence between the infrared energy and angle α is shown in FIG. 4. It is known that, the infrared energy corresponding to the angle of 0° is A1, and the infrared energy corresponding to the angle of 360° is A2. Then a correspondence between any infrared energy X between A1 and A2 and angle α may be represented by the following formula: $\alpha=360°\times(A1-X)/(A1-A2)$. There is a negative correlation between the infrared energy and the angle.

S504. Determine a rotation angle and/or a rotation direction of the rotating bezel according to an angle difference between the first angle and the second angle.

In this embodiment, if the first infrared energy is greater than the second infrared energy, it can be determined from FIG. 4 that, the first angle corresponding to the first infrared energy is less than the second angle corresponding to the second infrared energy. That is, the angle difference between the first angle and the second angle is less than 0. In this case, the rotation direction of the rotating bezel can be determined as a direction along which the width of the reflective surface gradually decreases. If the first infrared energy is less than the second infrared energy, the first angle corresponding to the first infrared energy is greater than the second angle corresponding to the second infrared energy. That is, the angle difference between the first angle and the second angle is greater than 0. In this case, the rotation direction of the rotating bezel can be determined as a direction along which the width of the reflective surface gradually increases.

S505. Determine a first interaction instruction corresponding to the rotation angle and/or the rotation direction of the rotating bezel according to a preset correspondence between a rotation angle and/or a rotation direction and a device interaction instruction.

The first interaction instruction is used to instruct the watch to perform an operation corresponding to the first interaction instruction.

For example, a page turning instruction is executed by rotating in the direction along which the width of the reflective surface gradually increases, and it is preset that, every 30° of rotation corresponds to turning one page backward. It is assumed that, a display interface of the watch includes 5 display pages, there are 5 function options of "call", "location", "settings", "sports", and "health" in sequence, and a current display interface is the "location" function option. When the rotation direction is the direction along which the width of the reflective surface gradually increases and the rotation angle is 60°, it is determined to turn 2 function options backward, that is, turn to the display page of the "sports" function option.

In the interaction method applied to the watch provided in this embodiment of the present disclosure, the infrared energy of the infrared module at different positions is obtained, and the rotation angle and/or the rotation direction of the rotating bezel are determined according to the infrared energy, thereby implementing device interaction, resolving the problem of poor anti-interference capability of the watch during the rotation interaction, and improving the accuracy of interaction results.

Figure 6:
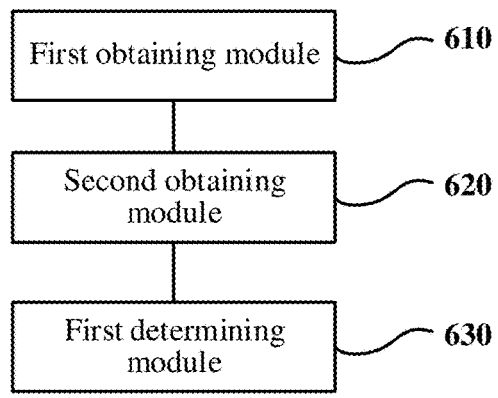
FIG. 6 is a schematic structural diagram of an interaction device according to an embodiment of the present disclosure.

FIG. 6 is a schematic structural diagram of an interaction device according to an embodiment of the present disclosure. Referring to FIG. 6, the interaction device includes: a first obtaining module 610, configured to obtain first infrared energy in a case that an infrared module is located at a first relative position of a rotating member; a second obtaining module 620, configured to obtain second infrared energy in a case that the infrared module is located at a second relative position of the rotating member; and a first determining module 630, configured to determine a rotation angle and/or a rotation direction of the rotating member according to the first infrared energy and the second infrared energy. The first relative position is a position of the infrared module relative to the rotating member before the rotating member rotates, and the second relative position is a position of the infrared module relative to the rotating member after the rotating member rotates.

In an embodiment, the first determining module 630 includes: a first determining unit, configured to determine a first angle corresponding to the first infrared energy and a second angle corresponding to the second infrared energy according to a preset correspondence between infrared energy and an angle, where the first angle is a deviation angle of the first relative position in a specified direction relative to an initial rotation position of the rotating member; and the second angle is a deviation angle of the second relative position in a specified direction relative to an initial rotation position of the rotating member; and a second determining unit, configured to determine the rotation angle and/or the rotation direction of the rotating member according to an angle difference between the first angle and the second angle.

In an embodiment, the interaction device further includes: a second determining module, configured to determine a first interaction instruction corresponding to the rotation angle and/or the rotation direction of the rotating member according to a preset correspondence between a rotation angle and/or a rotation direction and a device interaction instruction. The first interaction instruction is used to instruct an electronic device to perform an operation corresponding to the first interaction instruction.

The interaction device provided in this embodiment of the present disclosure can implement processes of the interaction method in the foregoing method embodiment. To avoid repetition, details are not described herein again.

The interaction device applied to the interaction method provided in this embodiment of the present disclosure obtains the infrared energy of the infrared module at different positions, and determines the rotation angle and/or the rotation direction of the rotating member according to the infrared energy, thereby implementing device interaction, resolving the problem of poor anti-interference capability of the device during the rotation interaction, and improving the accuracy of interaction results.

Specific embodiments of this specification are described above. Other embodiments fall within the scope of the appended claims. In some cases, the actions or steps recorded in the claims may be performed in sequences different from those in the embodiments and an expected result may still be achieved. In addition, the processes depicted in the accompanying drawings do not necessarily require the particular order shown or sequential order to achieve the expected results. In some implementations, multitasking and parallel processing may be feasible or beneficial.

Figure 7:
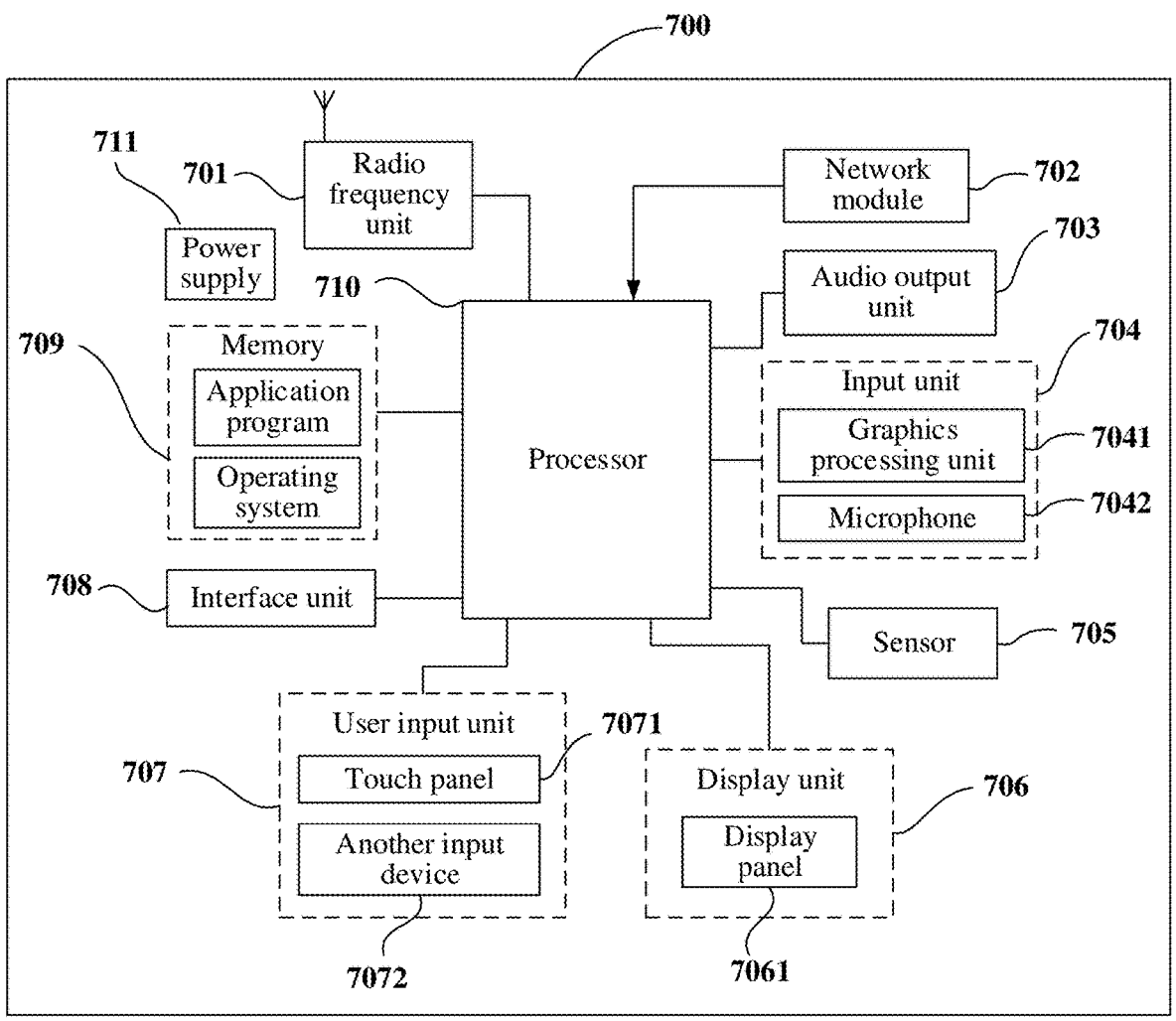
FIG. 7 is a schematic structural diagram of an electronic device according to an embodiment of the present disclosure.

FIG. 7 is a schematic structural diagram of an electronic device according to an embodiment of the present disclosure. The electronic device 700 includes, but is not limited to: a component such as a radio frequency unit 701, a network module 702, an audio output unit 703, an input unit 704, a sensor 705, a display unit 706, a user input unit 707, an interface unit 708, a memory 709, a processor 710, a power supply 711. A person skilled in the art may understand that, the electronic device structure shown in FIG. 7 does not constitute a limitation to the electronic device. The electronic device may include more or fewer components than those shown in the figure, may combine some components, or may have different component arrangements. In this embodiment of the present disclosure, the electronic device includes, but is not limited to a mobile phone, a tablet computer, a laptop computer, a palmtop computer, an in-vehicle terminal, a wearable device, a pedometer, and the like.

The processor 710 is configured to obtain first infrared energy in a case that an infrared module is located at a first relative position of a rotating member; obtain second infrared energy in a case that the infrared module is located at a second relative position of the rotating member; and determine a rotation angle and/or a rotation direction of the rotating member according to the first infrared energy and the second infrared energy. The first relative position is a position of the infrared module relative to the rotating member before the rotating member rotates, and the second relative position is a position of the infrared module relative to the rotating member after the rotating member rotates.

The electronic device applied to the interaction method provided in this embodiment of the present disclosure obtains the infrared energy of the infrared module at different positions, and determines the rotation angle and/or the rotation direction of the rotating member according to the infrared energy, thereby implementing device interaction, resolving the problem of poor anti-interference capability of the device during the rotation interaction, and improving the accuracy of interaction results.

It should be understood that, in this embodiment of the present disclosure, the radio frequency unit 701 may be configured to receive and transmit signals in a process of receiving and transmitting information or calls, for example, to receive downlink data from a base station, then transmit the downlink data to the processor 710 for processing; and additionally, transmit uplink data to the base station. Generally, the radio frequency unit 701 includes, but is not limited to, an antenna, at least one amplifier, a transceiver, a coupler, a low noise amplifier, a duplexer, and the like. In addition, the radio frequency unit 701 may further communicate with a network and another device through a wireless communication system.

The electronic device provides wireless broadband Internet access for a user through the network module 702, such as helps the user to receive and send an email, browse a web page, access streaming media, and the like.

The audio output unit 703 may convert audio data received by the radio frequency unit 701 and the network module 702 or stored in the memory 709 into an audio signal and output the audio signal as sound. Moreover, the audio output unit 703 may provide an audio output (such as call signal receiving sound or message receiving sound) that is related to a particular function executed by the electronic device 700. The audio output unit 703 includes a speaker, a buzzer, a receiver, and the like.

The input unit 704 is configured to receive an audio signal or a video signal. The input unit 704 may include a graphics processing unit (GPU) 7041 and a microphone 7042. The graphics processing unit 7041 processes image data of a static picture or a video that is obtained by an image acquisition device (such as a camera) in a video acquisition mode or an image acquisition mode. A processed image frame may be displayed on the display unit 706. The image frame processed by the graphics processing unit 7041 may be stored in the memory 709 (or other storage media) or transmitted via the radio frequency unit 701 or the network module 702. The microphone 7042 may receive sound and can process the sound into audio data. The processed audio data may be converted, in a phone talk mode, into a format that can be sent to a mobile communication base station via the radio frequency unit 701 to output.

The electronic device 700 further includes at least one sensor 705, such as an optical sensor, a motion sensor, and other sensors. For example, the optical sensor includes an ambient light sensor and a proximity sensor. The ambient light sensor may adjust luminance of the display panel 7061 according to brightness of the ambient light. The proximity sensor may switch off the display panel 7061 and/or backlight when the electronic device 700 is moved to the ear. As one type of the motion sensor, an acceleration sensor may detect magnitude of accelerations in various directions (generally on three axes), and may detect a magnitude and a direction of gravity when static, which may be configured to recognize an attitude of the electronic device (such as horizontal and vertical screen switching, a related game, and magnetometer attitude calibration), a function related to vibration recognition (such as a pedometer and a knock), and the like; the sensor 705 may further include other sensors such as a fingerprint sensor, a pressure sensor, an iris sensor, a molecular sensor, a gyroscope, a barometer, a hygrometer, a thermometer, and an infrared sensor. Details are not described herein.

The display unit 706 is configured to display information input by the user or information provided for the user. The display unit 706 may include a display panel 7061. The display panel 7061 may be configured by using a liquid crystal display (LCD), an organic light-emitting diode (OLED), or the like.

A user input unit 707 may be configured to receive input numeral or character information, and generate a key signal input related to a user setting and function control of the electronic device. For example, the user input unit 707 includes a touch panel 7071 and another input device 7072. The touch panel 7071, also referred to as a touchscreen, may collect a touch operation of a user on or near the touch panel (such as an operation of a user on or near the touch panel 7071 by using any suitable object or attachment, such as a finger or a touch pen). The touch panel 7071 may include two parts: a touch detection device and a touch controller. The touch detection device detects a touch orientation of the user, detects a signal brought by the touch operation, and transmits the signal to the touch controller. The touch controller receives touch information from the touch detection device, converts the touch information into a contact coordinate, then transmits the contact coordinate to the processor 710, receives and executes a command transmitted by the processor 710. In addition, the touch panel 7071 may be implemented by using various types, such as a resistive type, a capacitance type, an infrared type, and a surface acoustic wave type. In addition to the touch panel 7071, the user input unit 707 may further include the another input device 7072. For example, the another input device 7072 may include, but not limited to a physical keyboard, a functional key (such as a volume control key or a switch key), a track ball, a mouse, and a joystick, and details are not described herein.

Optionally, the touch panel 7071 may cover the display panel 7061. After detecting a touch operation on or near the touch panel, the touch panel 7071 transfers the touch operation to the processor 710, to determine a type of a touch event. Then, the processor 710 provides a corresponding visual output on the display panel 7061 according to the type of the touch event. In FIG. 7, the touch panel 7071 and the display panel 7061 implement, as two independent parts, input and output functions of the electronic device. However, in some embodiments, the touch panel 7071 and the display panel 7061 may be integrated to implement the input and output functions of the electronic device, and is not specifically limited herein.

The interface unit 708 is an interface through which an external device and the electronic device 700 are connected. For example, the external device may include a wired or wireless headset port, an external power supply (or a battery charger) port, a wired or wireless data port, a storage card port, a port used to connect an device having an identification module, an audio input/output (I/O) port, a video I/O port, an earphone port, and the like. The interface unit 708 may be configured to receive an input (for example, data information or power) from an external device, and transmit the received input to one or more elements in the electronic device 700, or may be configured to transmit data between the electronic device 700 and the external device.

The memory 709 may be configured to store a software program and various data. The memory 709 may mainly include a program storage area and a data storage area. The program storage area may store an operating system, an application program required by at least one function (for example, a sound playback function and an image playback function), or the like; The data storage area may store data (for example, audio data and a phone book) created according to use of the mobile phone. In addition, the memory 709 may include a high speed random access memory, and may further include a non-volatile memory, such as at least one magnetic disk storage device, a flash storage device or other non-volatile solid state storage devices.

The processor 710 is a control center of the electronic device, and connects various parts of the entire electronic device by using various interfaces and lines. By running or executing the software program and/or module stored in the memory 709, and invoking data stored in the memory 709, the processor performs various functions of the electronic device and processes data, thereby performing overall monitoring on the electronic device. The processor 710 may include one or more processing units; optionally, the processor 710 may integrate an application processor and a modem. The application processor mainly processes an operating system, a user interface, an application program, and the like. The modem mainly processes wireless communication. It may be understood that, the modem processor may alternatively not be integrated in the processor 710.

The electronic device 700 may further include the power supply 711 for supplying power to the components (such as a battery). Optionally, the power supply 711 may be logically connected to the processor 710 by using a power management system, thereby implementing functions such as charging, discharging, and power consumption management by using the power management system.

In addition, the electronic device 700 includes some unshown functional modules, and details are not described herein.

Optionally, an embodiment of the present disclosure further provides an electronic device, including a processor 710, a memory 709, and a computer program stored in the memory 709 and executable on the processor 710. The computer program, when executed by the processor 710, implements processes of the above described interaction method embodiment and can achieve the same technical effect. To avoid repetition, details are not described herein again.

An embodiment of the present disclosure further provides a non-transitory computer-readable storage medium, storing a computer program. The computer program, when executed by a processor, implements processes of the above described interaction method embodiment and can achieve the same technical effect. To avoid repetition, details are not described herein again. The non-transitory computer-readable storage medium may be a read-only memory (ROM), a random access memory (RAM), a magnetic disk, an optical disc, or the like.

It should be noted that, in this specification, terms "comprise", "include", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements defined by the sentence "comprising one" does not exclude that there are still other same elements in the processes, methods, objects, or devices.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present disclosure essentially or the part contributing to the existing technologies may be implemented in the form of a software product. The computer software product is stored in a storage medium (for example, a ROM/RAM, a magnetic disk or an optical disc), and includes several instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the above specific embodiments, and the above specific embodiments are merely exemplary and not limited. A person of ordinary skill in the art may make many forms in enlightenment of the present disclosure without departing from the principle and protection scope of the present disclosure, and the forms shall fall within the protection scope of the present disclosure.

What is claimed is:

1. An electronic device, comprising a rotating member and an infrared module, wherein the rotating member and the infrared module are disposed opposite to each other;
   a surface of the rotating member opposite to the infrared module is provided with an annular region, a reflective surface is disposed on the annular region, and a width of the reflective surface gradually increases or gradually decreases along a circumferential direction of the annular region;
   the infrared module comprises an infrared transmitter and an infrared receiver, and light emitted by the infrared transmitter is reflected by the reflective surface and then received by the infrared receiver, wherein during rotation of the rotating member, the light received by the infrared receiver is enhanced with an increase of a width of a portion of the reflective surface directly facing the infrared module, wherein:
   the electronic device determines an interaction instruction according to a strength of a signal received by the infrared module;
   the interaction instruction is determined according to a rotation angle and/or a rotation direction of the rotating member;
   the rotation angle and/or the rotation direction of the rotating member are determined, according to an angle difference between a first angle and a second angle;
   the first angle and the second angle are determined according to a preset correspondence between infrared energy and an angle;
   the first angle is a deviation angle of a first relative position in a specified direction relative to an initial rotation position of the rotating member;
   the second angle is a deviation angle of a second relative position in the specified direction relative to the initial rotation position of the rotating member;
   the first relative position is a position of the infrared module relative to the rotating member when obtaining first infrared energy, and the second relative position is a position of the infrared module relative to the rotating member when obtaining second infrared energy; and
   the first infrared energy corresponds to the first angle and the second infrared energy corresponds to the second angle.

2. The electronic device according to claim 1, wherein the reflective surface is coated with a reflective layer.

3. The electronic device according to claim 1, wherein the reflective surface is coated white.

4. An interaction method, applied to an electronic device, the electronic device comprises a rotating member and an infrared module, wherein the rotating member and the infrared module are disposed opposite to each other; a surface of the rotating member opposite to the infrared module is provided with an annular region, a reflective surface is disposed on the annular region, and a width of the reflective surface gradually increases or gradually decreases along a circumferential direction of the annular region; the infrared module comprises an infrared transmitter and an infrared receiver, and light emitted by the infrared transmitter is reflected by the reflective surface and then received by the infrared receiver; wherein during rotation of the rotating member, the light received by the infrared receiver is enhanced with an increase of a width of a portion of the reflective surface directly facing the infrared module, the method comprising:
   obtaining first infrared energy in a case that the infrared module is located at a first relative position of the rotating member;
   obtaining second infrared energy in a case that the infrared module is located at a second relative position of the rotating member; and
   determining a rotation angle and/or a rotation direction of the rotating member according to the first infrared energy and the second infrared energy;
   determining an interaction instruction according to the rotation angle and/or the rotation direction;
   wherein:
   the first relative position is a position of the infrared module relative to the rotating member before the rotating member rotates, and the second relative position is a position of the infrared module relative to the rotating member after the rotating member rotates;
   the determining the rotation angle and/or the rotation direction of the rotating member according to the first infrared energy and the second infrared energy comprises:
      determining a first angle corresponding to the first infrared energy and a second angle corresponding to the second infrared energy, according to a preset correspondence between infrared energy and an angle, the first angle being a deviation angle of the first relative position in a specified direction relative to an initial rotation position of the rotating member, and the second angle being a deviation angle of the second relative position in the specified direction relative to the initial rotation position of the rotating member; and
      determining the rotation angle and/or the rotation direction of the rotating member according to an angle difference between the first angle and the second angle.

5. The method according to claim 4, further comprising:
   determining a first interaction instruction corresponding to the rotation angle and/or the rotation direction of the rotating member according to a preset correspondence between a rotation angle and/or a rotation direction and a device interaction instruction, wherein the first interaction instruction is used to instruct the electronic device to perform an operation corresponding to the first interaction instruction.

6. An electronic device, comprising:
   a memory, storing computer program instructions;
   a processor; and a rotating member and an infrared module disposed opposite to each other;

wherein:

a surface of the rotating member opposite to the infrared module is provided with an annular region, a reflective surface is disposed on the annular region, and a width of the reflective surface gradually increases or gradually decreases along a circumferential direction of the annular region;

the infrared module comprises an infrared transmitter and an infrared receiver, and light emitted by the infrared transmitter is reflected by the reflective surface and then received by the infrared receiver;

during rotation of the rotating member, the light received by the infrared receiver is enhanced with an increase of a width of a portion of the reflective surface directly facing the infrared module;

the computer program instructions, when executed by the processor, causes the electronic device to perform:

obtaining first infrared energy in a case that the infrared module is located at a first relative position of the rotating member;

obtaining second infrared energy in a case that the infrared module is located at a second relative position of the rotating member;

determining a rotation angle and/or a rotation direction of the rotating member according to the first infrared energy and the second infrared energy;

determining an interaction instruction according to the rotation angle and/or the rotation direction;

the first relative position is a position of the infrared module relative to the rotating member before the rotating member rotates, and the second relative position is a position of the infrared module relative to the rotating member after the rotating member rotates;

the computer program instructions, when executed by the processor, further cause the electronic device to further perform:

determining a first angle corresponding to the first infrared energy and a second angle corresponding to the second infrared energy, according to a preset correspondence between infrared energy and an angle, the first angle being a deviation angle of the first relative position in a specified direction relative to an initial rotation position of the rotating member, and the second angle being a deviation angle of the second relative position in the specified direction relative to the initial rotation position of the rotating member; and determining the rotation angle and/or the rotation direction of the rotating member according to an angle difference between the first angle and the second angle.

7. The electronic device according to claim 6, wherein the computer program instructions, when executed by the processor, causes the electronic device to further perform:

determining a first interaction instruction corresponding to the rotation angle and/or the rotation direction of the rotating member according to a preset correspondence between a rotation angle and/or a rotation direction and a device interaction instruction, wherein the first interaction instruction is used to instruct the electronic device to perform an operation corresponding to the first interaction instruction.

8. A non-transitory computer-readable storage medium, storing a computer program, wherein the computer program, when executed by a processor of an electronic device, causes the electronic device to perform steps of the interaction method according to claim 4.

9. The non-transitory computer-readable storage medium according to claim 8, wherein the computer program, when executed by the processor, causes the electronic device to further perform:

determining a first interaction instruction corresponding to the rotation angle and/or the rotation direction of the rotating member according to a preset correspondence between a rotation angle and/or a rotation direction and a device interaction instruction, wherein the first interaction instruction is used to instruct the electronic device to perform an operation corresponding to the first interaction instruction.

* * * * *